May 26, 1953

E. A. GLYNN 2,639,466

METHOD OF PLACING A TIRE IN AND
REMOVING SAME FROM A MOLD

Filed April 21, 1952

INVENTOR
*Edwin A. Glynn*
BY
*Webster & Webster*
ATTYS

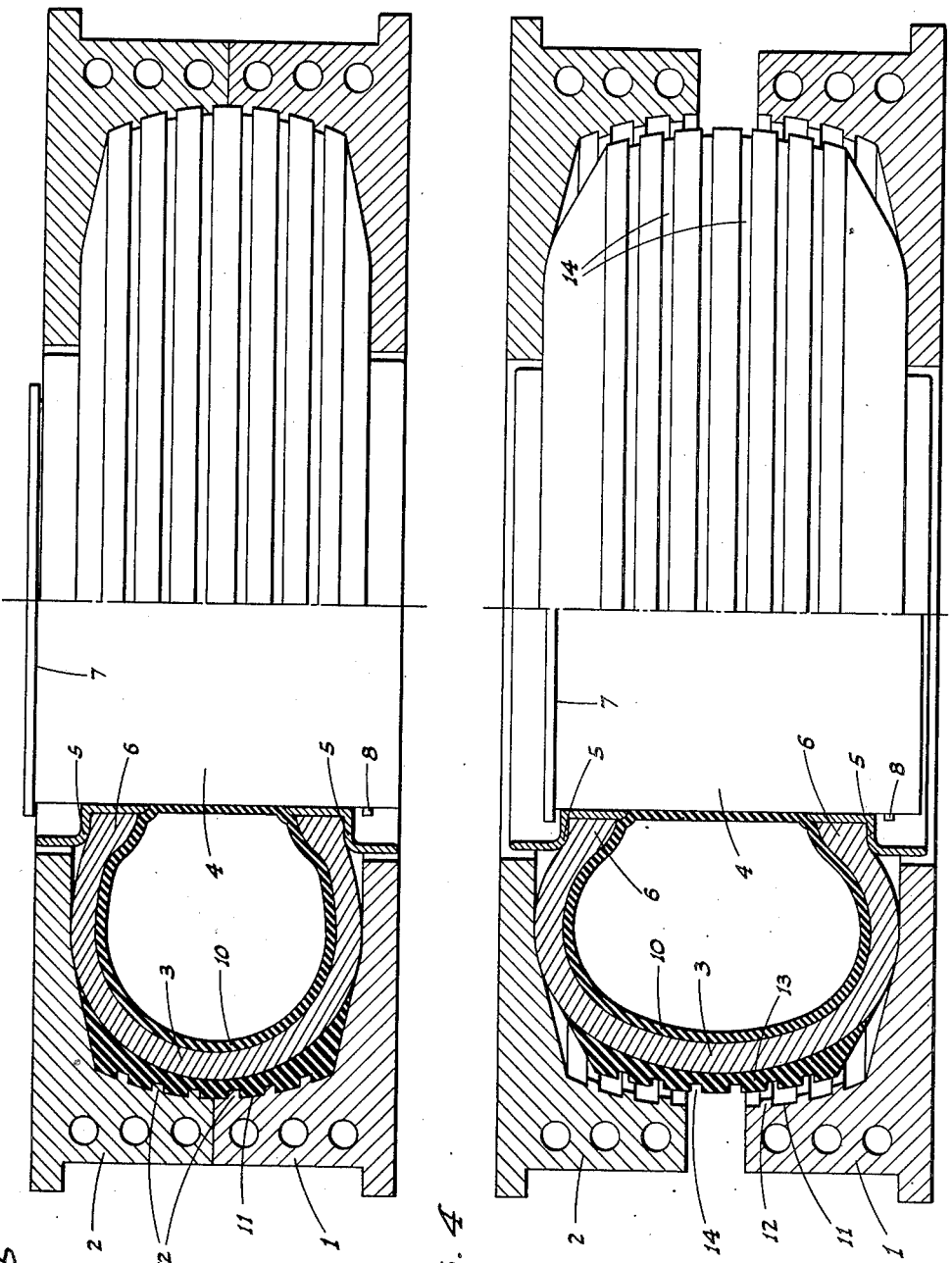

Patented May 26, 1953

2,639,466

UNITED STATES PATENT OFFICE 2,639,466

METHOD OF PLACING A TIRE IN AND REMOVING SAME FROM A MOLD

Edwin A. Glynn, Lodi, Calif., assignor to Super Mold Corporation of California, Lodi, Calif., a corporation of California Application April 21, 1952, Serial No. 283,416

4 Claims. (Cl. 18—48)

1

This invention relates to the tire treading or retreading industry, and particularly to a method of placing a tire to be treaded into a vulcanizing mold of the proper size for efficiently operating on such tire, and subsequently removing the vulcanized tire from the mold.

With respect to the very large sized multiple-ply tires used on tractors and other heavy equipment, it has been found that such tires are so stiff and inflexible that if handled in the conventional manner, it is next to impossible to get them into the mold without scuffing or distorting the fresh soft rubber of the camelback. Even more of a problem has been the removal of the vulcanized tire from the mold, since the rigidity or non-flexibility of the tire, coupled with the interlocking of the tread-groove ribs in the matrix with the new tread, makes it almost impossible to pull the tire out of the mold without ruining such tread.

It is therefore the major object of this invention to provide a method of tire mounting and manipulation which will enable the diameter of a tire to be temporarily reduced so that the tire may be readily inserted into a rigid continuous-matrix mold, then caused to properly and closely fit the mold for the necessary tread-molding and vulcanizing action, and then be again reduced in diametral size while still confined in the mold so as to disengage the tread from the matrix, in order that the tire may be removed without possible damage to the tread and without the use of excessive force.

It is also an object of the invention to provide a tire manipulating method which may be carried out without any change in the mold itself being necessary, and requires only a special but relatively simple bead-flange drum unit to be used.

Still another object of the invention is to provide a practical and reliable method of placing a tire in and removing same from a mold, and yet one which will be exceedingly effective for the purpose for which it is designed.

These objects are accomplished in the manner as will fully appear by a perusal of the following specification.

Various steps of the method are illustrated by the accompanying drawings in which:

Fig. 3 is a similar view showing the matrix as fully closed and locked about the tire after deflation of the latter.

Fig. 4 is a similar view showing the matrix, after vulcanizing of the tire, and after being unlocked, as being opened by reinflation of the tire.

Figure 1:
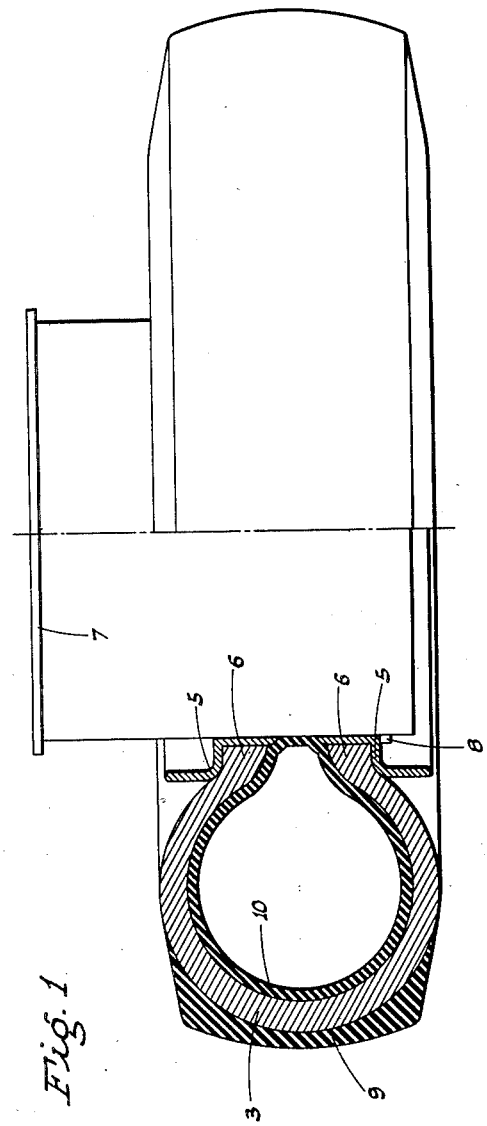
Fig. 1 is a diametral diagram, mainly in section, showing the deflated tire as initially placed on the bead-flange supporting drum.

The method is carried out in connection with a standard mold which includes fixed and removable annular matrix halves 1 and 2 respectively. These halves or sections are heated by suitable means, and are adapted when closed on each other to properly engage the tire 3 to be treaded.

Special equipment employed comprises a drum 4 on which opposed flange-rings 5 are slidable, said rings being arranged to seat the beads 6 of the tire. The axial extent of the drum is sufficient to allow of considerable separation of the rings 5, or to a much greater extent than is needed to locate the rings in position for the deflated condition of the tire. At its upper end, the drum is provided with a fixed outwardly projecting stop flange 7 which prevents removal of the rings 5 from this end, while retractible stops 8 project from adjacent the lower end of the drum to normally prevent removal of the adjacent ring 5 from said end. This specific drum and ring unit is shown and described in my copending application for United States patent Serial No. 282,419 filed April 15, 1952.

In carrying out the method, the tire 3 to be treaded is provided with the new camelback 9 for the tread, and is placed in an uninflated condition on the rings 5 supported by drum 4, an inflatable tube 10 being first placed within the tire as shown in Fig. 1. In this condition the tire diameter is frequently too great to readily fit into the mold matrix.

Figure 2:
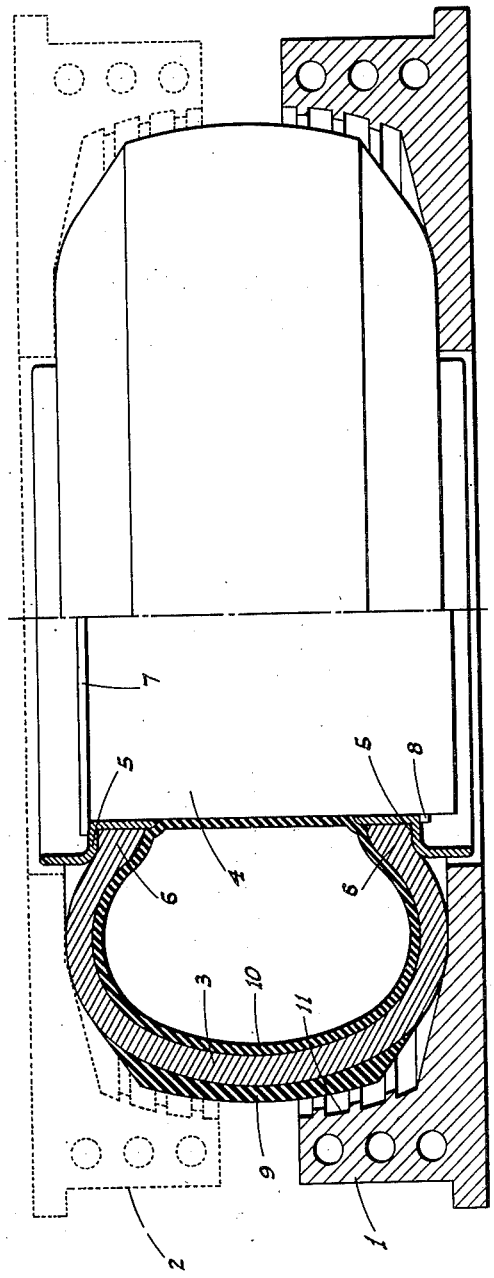
Fig. 2 is a similar view showing the tire as inflated on the drum and lowered into the open matrix of a mold.

The tire is therefore inflated, through the medium of tube 10, and since the bead rings 5 are not connected and are free to separate along the drum, the air pressure in tube 10 causes the beads 6 to so separate. The extent of separation is limited by engagement of the rings 5 with the stop flange 7 and the stops 8. This increases the width of the tire, but at the same time causes the diameter thereof to be reduced, deforming the tire, so that it may be placed into the matrix section 1 without contact with the tread engaging face 11 thereof, as shown in Fig. 2.

After the tire is thus lowered into the matrix section 1 so that the tire at its lower side rests on the matrix, the upper matrix section 2 is lowered into place over the tire, said section being there temporarily supported, clear of the lower section 1, by the upper side of the inflated tire. No trouble is, of course, encountered in thus placing the upper matrix section, since the tire, being still inflated at the time, is deformed to the smaller-than-normal diameter as previously explained.

After the above operation is carried out, the tire is deflated. This allows the upper matrix section 2 to be readily moved into closing engagement with the lower matrix section 1. The pressure of matrix section 2 against the tire as said section is thus moved, causes the sides of the tire, and the tire beads and rings 5, to be shifted toward each other, increasing the diameter of the tire or restoring the same substantially to normal.

The matrix sections after being thus brought together, are locked against separation as usual. The tire is then reinflated, and since the beads cannot now separate because of the confining action of the adjacent portions of the sidewalls of the tire, the camelback 9 is pushed radially out and into pressing engagement with the tread engaging surface 11 of the matrix. At the same time, of course, the tread-design forming ribs 12 of the matrix are pressed into the soft unvulcanized camelback rubber 9, as shown in Fig. 3.

In connection with the vulcanizing of the tread rubber which then follows, it may be stated that the mold is preferably preheated so as to reduce the time required to bring the mold to vulcanizing temperature after the tire is in place, and to cause the camelback to become somewhat workable without surface vulcanization taking place.

The tire remains in the mold in the above inflated condition for the necessary vulcanizing period, after which the tire is deflated. This removes the pressure on the matrix sections tending to force them apart, and enables the locking or hold-down mechanism of said sections to be readily actuated to release the sections from each other. The matrix sections having been unlocked so as to allow them to separate from each other, the tire is again inflated. This inflation causes the tire sidewalls and beads 6 and the rings 5 to move apart on the drum 4, and at the same time pulls the now vulcanized tread 13 radially inward, or in other words, decreases its diameter, disengaging the matrix ribs 12 from the grooves 14 made thereby in the tire tread 13. The moving-apart action of the tire sidewalls also lifts the upper matrix section 2, as shown in Fig. 4.

Said upper section 2 is then moved entirely clear of the tire by suitable mechanism as usual, exposing the still inflated tire, and the drum 4, in the clear for hoisting of the same out of the lower matrix and away from the mold. After the tire and drum unit has been then lowered to the floor or ground, the tire is deflated, stops 8 are retracted, and the drum is lifted out of the tire and rings 5; said rings and the tube 10, being subsequently disengaged from the tire; which is then ready for use.

It will thus be seen that a tire manipulating method has been provided by means of which any tire of a certain normal diameter and regardless of its size and inherent stiffness or relative inflexibility, may be easily placed in and removed from a mold of the correct size for a tire of such diameter.

From the foregoing description it will be readily seen that there has been produced such a method as substantially fulfills the objects of the invention as set forth herein.

While this specification sets forth the present and preferred details of the invention, still in practice such deviations from such details may be resorted to as do not form a departure from the spirit of the invention, as defined by the appended claims.

Having thus described the invention, the following is claimed as new and useful, and upon which Letters Patent are desired:

1. The method of manipulating an initially deflated tire for placement of the same into a vulcanizing mold having axially separable annular mold-halves whose diameter is no greater than that of the normal diameter of the tire and one of which is initially clear of the other; the method comprising the steps of axially separating the beads of the tire a predetermined distance so as to deform the tire and reduce the diameter of the same to a size less than that of the matrix halves, moving the tire axially of and into said other matrix half in supported relation thereby while maintaining the beads thus separated, placing said one matrix half onto the tire in supported relation thereby while still maintaining the tire beads separated, and then allowing the beads to move together so as to cause the tire to reassume its normal diameter and shape in fitting relation to the matrix halves and at the same time allowing the matrix halves to come together in closing relation.

2. The method of manipulating an initially deflated tire for placement of the same into a vulcanizing mold having axially separable annular mold-halves whose diameter is no greater than that of the normal diameter of the tire and one of which is initially clear of the other; the method comprising the steps of mounting the beads of the tire for limited sliding movement axially of each other, inflating the tire to cause the beads to separate so as to deform the tire and reduce the diameter to a size less than that of the matrix halves, moving the inflated tire axially into said other mold half in supported relation thereby, placing said one matrix half onto the inflated tire in supported relation thereby, and deflating the tire to allow the same to reassume its normal shape and size in fitting relation to the matrix halves and also allowing the matrix halves to come together in closing relation.

3. A method as in claim 2, followed by the steps of locking the matrix halves against separation, and then reinflating the tire to force the same into close engagement with the walls of the mold for a vulcanizing operation.

4. A method as in claim 3, followed by the steps of again deflating the tire, unlocking the matrix halves, and then again inflating the tire to cause separation of the beads and reduction of the tire diameter, so as to move the tire tread radially away from the tread engaging surfaces of the matrix halves to permit of withdrawal of said one matrix half from the tire and of the latter from said other matrix half.

EDWIN A. GLYNN.

No references cited.